United States Patent
Mitchell et al.

(10) Patent No.: US 7,969,323 B2
(45) Date of Patent: Jun. 28, 2011

(54) INSTRUMENTED COMPONENT FOR COMBUSTION TURBINE ENGINE

(75) Inventors: David J. Mitchell, Oviedo, FL (US); Anand A. Kulkarni, Oviedo, FL (US); Ramesh Subramanian, Oviedo, FL (US); Edward R. Roesch, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1298 days.

(21) Appl. No.: 11/521,193

(22) Filed: Sep. 14, 2006

(65) Prior Publication Data

US 2010/0226757 A1    Sep. 9, 2010

(51) Int. Cl.
*G08C 19/12* (2006.01)
(52) U.S. Cl. .......... 340/870.17; 73/754; 455/41.2; 702/130; 702/117; 340/873.4
(58) Field of Classification Search .......... 340/870.17, 340/573.4; 702/130, 117; 73/754; 455/41.2
See application file for complete search history.

(56) References Cited

U.S. PATENT DOCUMENTS

| | | | |
|---|---|---|---|
| 3,876,998 A | 4/1975 | Richter et al. | |
| 3,890,456 A | 6/1975 | Dils | |
| 4,546,652 A | 10/1985 | Virkar et al. | |
| 4,578,992 A | 4/1986 | Galasko et al. | |
| 4,595,298 A | 6/1986 | Frederick | |
| 4,656,463 A * | 4/1987 | Anders et al. | 340/573.4 |
| 4,812,050 A | 3/1989 | Epstein | |
| 4,851,300 A | 7/1989 | Przybyszewski | |
| 4,916,715 A | 4/1990 | Adiutori | |
| 4,969,956 A | 11/1990 | Kreider et al. | |
| 4,970,670 A | 11/1990 | Twerdochlib | |
| 4,983,034 A | 1/1991 | Spillman, Jr. | |
| 5,144,299 A | 9/1992 | Smith | |
| 5,306,368 A | 4/1994 | Yamada et al. | |
| 5,318,725 A | 6/1994 | Sandhage | |
| 5,440,300 A | 8/1995 | Spillman, Jr. | |
| 5,578,877 A | 11/1996 | Tiemann | |
| 5,952,836 A | 9/1999 | Haake | |
| 5,969,260 A | 10/1999 | Belk et al. | |
| 5,969,639 A * | 10/1999 | Lauf et al. | 340/870.17 |
| 5,970,393 A | 10/1999 | Khorrami et al. | |
| 6,000,977 A | 12/1999 | Haake | |
| 6,034,296 A | 3/2000 | Elvin et al. | |

(Continued)

OTHER PUBLICATIONS

*Sensors for Harsh Environments by Direct Write Thermal Spray.* By Jon, Longtin, et al. Center for Thermal Spray Research, State University of New York, Stony Brook, NY, and Robert Greenlaw. Integrated Coatings Solutions, Inc., Huntington Beach, CA.

(Continued)

*Primary Examiner* — Albert K Wong

(57) ABSTRACT

An instrumented component (18, 19) for use in various operating environments such as within a combustion turbine engine (10). The component (18, 19) may have a substrate, a sensor (50, 94, 134) connected with the substrate for sensing a condition of the component (18, 19) during operation of the combustion turbine (10) and a connector (52, 92, 140) attached to the substrate and in communication with the sensor (50, 94, 134) for routing a data signal from the sensor (50, 94, 134) to a termination location (53). The component (18, 19) may include a wireless telemetry device (54, 76, 96) in communication with the connector (52, 92, 140) for wirelessly transmitting the data signal. Recesses (114, 116) may be formed with a root portion (112, 132) of components (18, 19) within which wireless telemetry device (54, 76, 96) may be affixed.

20 Claims, 4 Drawing Sheets

U.S. PATENT DOCUMENTS

| | | | |
|---|---|---|---|
| 6,072,165 | A | 6/2000 | Feldman |
| 6,109,783 | A | 8/2000 | Dobler et al. |
| 6,127,040 | A | 10/2000 | Grobbauer et al. |
| 6,142,665 | A | 11/2000 | Haffner et al. |
| 6,197,424 | B1 | 3/2001 | Morrison et al. |
| 6,262,550 | B1 | 7/2001 | Kliman et al. |
| 6,280,083 | B2 | 8/2001 | Kita et al. |
| 6,331,823 | B1 | 12/2001 | El-Ibiary |
| 6,343,251 | B1 | 1/2002 | Herron et al. |
| 6,398,503 | B1 | 6/2002 | Takahashi et al. |
| 6,437,681 | B1 | 8/2002 | Wang et al. |
| 6,512,379 | B2 | 1/2003 | Harrold et al. |
| 6,523,383 | B2 | 2/2003 | Joki et al. |
| 6,532,412 | B2 | 3/2003 | Adibhatla et al. |
| 6,556,956 | B1 | 4/2003 | Hunt |
| 6,564,644 | B1 * | 5/2003 | Kurtz .............................. 73/754 |
| 6,576,861 | B2 | 6/2003 | Sampath et al. |
| 6,591,182 | B1 | 7/2003 | Cece et al. |
| 6,667,725 | B1 | 12/2003 | Simons et al. |
| 6,677,683 | B2 | 1/2004 | Klausing et al. |
| 6,729,187 | B1 | 5/2004 | Gregory |
| 6,735,549 | B2 | 5/2004 | Ridolfo |
| 6,756,131 | B2 | 6/2004 | Oguma et al. |
| 6,756,908 | B2 | 6/2004 | Gass et al. |
| 6,760,689 | B2 | 7/2004 | Follin et al. |
| 6,796,187 | B2 | 9/2004 | Srinivasan et al. |
| 6,808,813 | B2 | 10/2004 | Kimura et al. |
| 6,816,817 | B1 | 11/2004 | Retlich et al. |
| 6,831,555 | B1 | 12/2004 | Miller et al. |
| 6,838,157 | B2 | 1/2005 | Subramanian |
| 6,959,255 | B2 * | 10/2005 | Ye et al. ........................ 702/117 |
| 6,979,498 | B2 | 12/2005 | Darolia et al. |
| 6,979,991 | B2 | 12/2005 | Burns et al. |
| 7,004,622 | B2 | 2/2006 | Hardwicke et al. |
| 7,009,310 | B2 | 3/2006 | Cheung et al. |
| 7,231,180 | B2 * | 6/2007 | Benson et al. ................ 455/41.2 |
| 7,299,148 | B2 * | 11/2007 | Hunt et al. .................... 702/130 |
| 7,343,136 | B2 * | 3/2008 | Liu et al. ....................... 455/66.1 |
| 7,360,437 | B2 | 4/2008 | Hardwicke et al. |
| 7,365,455 | B2 * | 4/2008 | Hamel et al. .................. 307/151 |
| 7,419,299 | B2 * | 9/2008 | Akram et al. .................. 374/137 |
| 2004/0101022 | A1 * | 5/2004 | Hardwicke et al. ........... 374/141 |
| 2004/0114666 | A1 | 6/2004 | Hardwicke et al. |
| 2006/0018361 | A1 | 1/2006 | Hardwicke et al. |
| 2006/0020415 | A1 | 1/2006 | Hardwicke et al. |

OTHER PUBLICATIONS

*Laser-Induced Materials and Processes for Rapid Prototyping.* By L. Lu, et al. Chapter 6: Metal-Based System Via Laser Melting. The National University of Singapore. Boston, Kluwer Academic Publishers.

*Direct-Write Technologies for Rapid Prototyping Applications*: Sensors, Electronics, and Integrated Power Sources. Chapter 9: Direct-Write Thermal Spraying of Multilayer Electronics and Sensor Structures, by Sansay Sampath, et al. pp. 261-302. San Diego, CA: Academic Press.

*Advances in Thin Film Sensor Technologies for Engine Applications.* By Jih-Fen Lei et al. NASA Technical Memorandum 107418. Prepared for Turbo Expo Jun. 2-5, 1997 Orlando, Florida, (1997).

*Wireless Telemetry for Gas-Turbine Applications.* By Russel G. DeAnna. NASA Technical Memorandum 2000-209815, Mar. 2000.

\* cited by examiner

INSTRUMENTED COMPONENT FOR COMBUSTION TURBINE ENGINE

STATEMENT OF GOVERNMENT INTEREST

The Government of the United States of America has certain rights in this invention pursuant to Contract No. 70NANB4H3042, awarded by the U.S. Department of Commerce, National Institute of Standards and Technology.

FIELD OF THE INVENTION

The present invention relates generally to monitoring operating environments and in particular to components enabled for wirelessly transmitting data with respect to the condition of individual components within an operating environment such as a gas turbine engine.

BACKGROUND OF THE INVENTION

Gas combustion turbines are used for a variety of applications such as driving an electric generator in a power generating plant or propelling a ship or an aircraft. Firing temperatures in modern gas turbine engines continue to increase in response to the demand for higher efficiency engines. Superalloy materials have been developed to withstand the corrosive high temperature environment that exists within a gas turbine engine. However, even superalloy materials are not able to withstand extended exposure to the hot combustion gas of a current generation gas turbine engine without some form of cooling and/or thermal insulation.

The instrumentation of a component such as a blade or vane within a gas turbine typically includes placing wire leads on the balance wheel, which continue on to the blade airfoil. The wire leads are typically held together by an epoxy. These wires are routed from within the component to the turbine casing. The pressure boundary of a component may be breached to introduce a sensor such as a thermocouple and a braze is back filled to hold the thermocouple in place. Each thermocouple sensor has wire leads coming out of the component that are connected back to a diagnostic unit. Instrumenting a plurality of components in this manner results in an extensive network of wires just for monitoring the single operating condition of temperature.

DETAILED DESCRIPTION OF THE INVENTION

Figure 1:
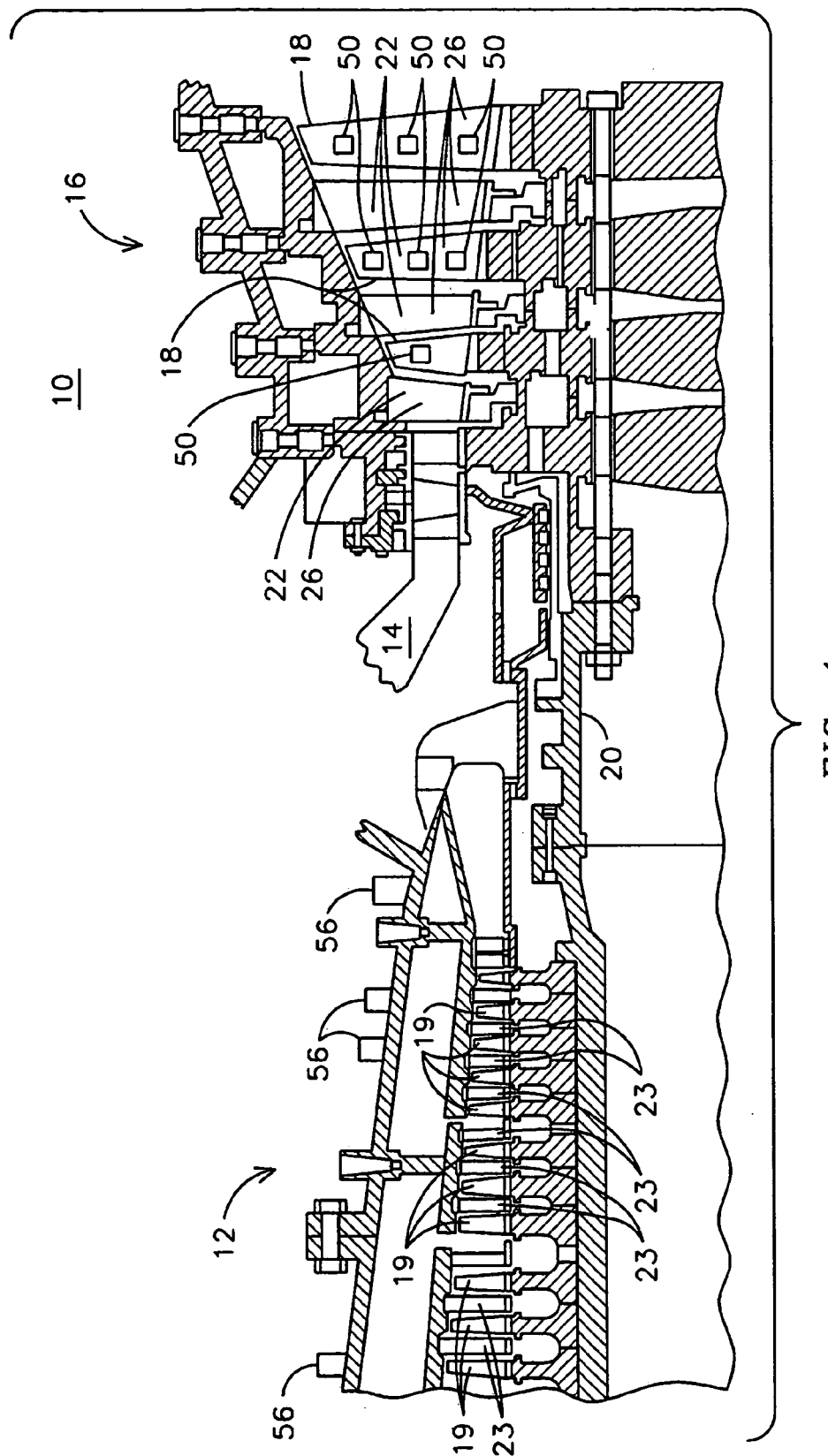
FIG. 1 is a cross sectional view of an exemplary combustion turbine.

FIG. 1 illustrates an exemplary combustion turbine 10 such as a gas turbine used for generating electricity. Embodiments of the invention may be used with combustion turbine 10 or in numerous other operating environments and for various purposes. Combustion turbine 10 includes a compressor 12, at least one combustor 14 (broken away) and a turbine 16. Compressor 12, combustor 14 and turbine 16 are sometimes referred to collectively as a gas or combustion turbine engine 10. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel-based alloys, and may be coated with a thermal barrier coating 26, such as yttria-stabilized zirconia. Similarly, compressor 12 includes a plurality of rotating blades 19 positioned between respective vanes 23.

In use, air is drawn in through compressor 12, where it is compressed and driven towards combustor 14. Combustor 14 mixes the air with fuel and ignites it thereby forming a working gas. This working gas temperature will typically be above about 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example steam or compressed air, to blades 18 and vanes 22.

The environment within which turbine blades 18 and vanes 22 operate is particularly harsh, being subject to high operating temperatures and corrosive atmosphere, which may result in serious deterioration of blades 18 and vanes 22. This is especially likely if the thermal barrier coating 26 should spall or otherwise deteriorate. Embodiments of the invention are advantageous because components may transmit data indicative of a component's condition during operation of combustion turbine 10.

U.S. Pat. No. 6,576,861, which is specifically incorporated herein by reference, discloses a method and apparatus that may be used to deposit embodiments of sensors and sensor connectors with transmitters in accordance with aspects of the present invention. In this respect, methods and apparatus disclosed therein may be used for the patterning of fine sensor and/or connector features of between about 100 microns and 500 microns without the need of using masks. Multilayer electrical circuits and sensors may be formed by depositing features using conductive materials, resistive materials, dielectric materials, insulative materials and other application specific materials. Alternate methods may be used to deposit multilayer electrical circuits and sensors in accordance with aspects of the invention. For example, thermal spraying, vapor deposition, laser sintering and curing deposits of material sprayed at lower temperatures may be used as well as other suitable techniques.

Figure 2:
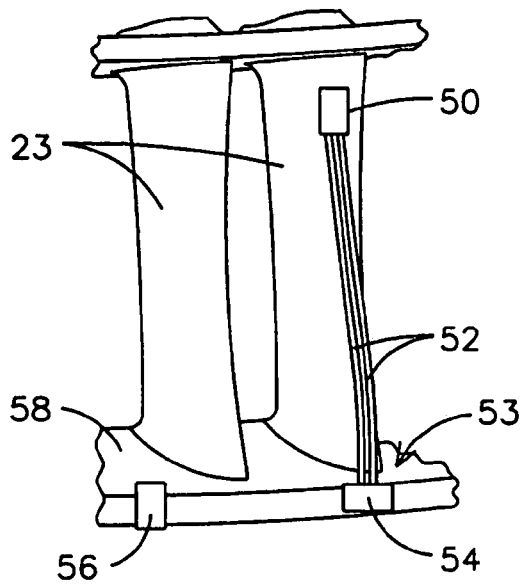
FIG. 2 is a perspective view of an exemplary combustion turbine vane.

FIG. 2 illustrates a pair of adjacent vanes 23 removed from compressor 12 with one vane 23 having a sensor 50 mounted or connected thereto for detecting a condition of the vane. A connector 52 may be deposited as a means for routing a data signal from sensor 50 to a transmitter 54 configured for wirelessly transmitting the data signal to a transceiver 56. Connector 52 may be one or a plurality of electrical leads for conducting a signal from sensor 50 to transmitter 54. Alternate embodiments allow for various types of connectors 52 to be used as a means for routing a data signal from sensor 50 to transmitter 54, depending on the specific application.

Transmitters 54 may be multi-channel and have various specifications depending on their location within a casing of combustion turbine 10. Transmitters 54 may be configured to function within the early stages of compressor 12, which are subject to operating temperatures of between about 80° C. to 120° C. Transmitters 54 may be configured to function within later stages of compressor 12 and/or stages of turbine 16 subject to operating temperatures of greater than about 120° C. and up to about 300° C. Transmitters 54 may be fabricated using silicon-on-insulator (SOI) technology and other materials capable of operating in regions with temperatures greater than about 120° C.

Figure 3:
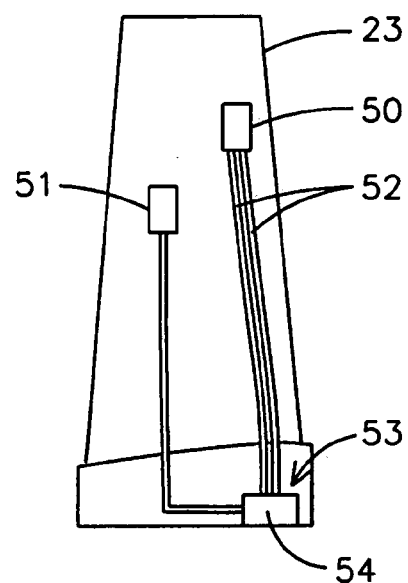
FIG. 3 is a side view of the vane of FIG. 2.

FIG. 3 illustrates a schematic plan view of compressor vane 23 having sensor 50 connected therewith and connector 52 connecting sensor 50 with transmitter 54. A power source 51 may be provided, such as an appropriately sized battery for powering transmitter 54. Transmitter 54 may receive signals from sensor 50 via connector 52 that are subsequently wirelessly transmitted to transceiver 56. Transceiver 56 may be mounted on hub 58 or on a surface external to compressor 12 such as the exemplary locations shown in FIG. 1. Transceiver 56 may be mounted in various locations provided it is within sufficient proximity to transmitter 54 to receive a wireless data transmission, such as an RF signal from transmitter 54.

One or more sensors 50 may be connected with one or more compressor vanes 23 by fabricating or depositing sensor 50 and connector 52 directly onto a surface of vane 23. Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23. Embodiments allow for a distal end 53 of connectors 52 to be exposed at a termination location, which may be proximate a peripheral edge of a component or other suitable location. This allows a field technician to quickly and easily connect connector 52 to a transmitter 54 regardless of its location.

Figure 4:
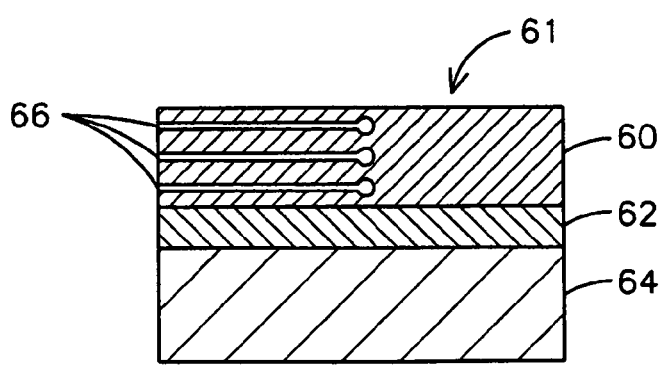
FIG. 4 is an exemplary heat flux sensor deposited on a substrate.

FIG. 4 illustrates an exemplary sensor 61 that may be deposited within a barrier coating such as a thermal barrier coating (TBC) 60, which may be yttria-stabilized zirconia. TBC 60 may be deposited on a bond coat 62, which may be deposited on a substrate 64. Substrate 64 may be various components such as a superalloy suitable for use in turbine 16 such as a turbine blade 18. Sensor 61 may be formed for various purposes and may include thermocouples 66 deposited using conventional K, N, S, B and R-type thermocouple material, or any combination of their respective constituent elements provided that the combination generates an acceptable thermoelectric voltage for a particular application within combustion turbine 10.

Type K thermocouple materials NiCr or NiAl may be used in sections of compressor 12 having an operating environment up to approximately 800° C. For example, NiCr(20) may be used to deposit a strain gage in compressor 12. Type N thermocouple material, such as alloys of NiCrSi and NiSi, for example, may be used for depositing sensors in sections of turbine 16 having an operating environment between approximately 800° C. to 1150° C.

Type S, B and R thermocouple materials may be used for depositing sensors in sections of turbine 16 having an operating environment between approximately 1150° C. to 1350° C. For example, Pt—Rh, Pt—Rh(10) and Pt—Rh(13) may be deposited to form sensors 50 within turbine 16 provided that the material generates an acceptable thermoelectric voltage for a particular application within combustion turbine 10. Ni alloys, for example NiCr, NiCrSi, NiSi and other oxidation-resistant Ni-based alloys such as MCrAlX, where M may be Fe, Ni or Co, and X may be Y, Ta, Si, Hf, Ti, and combinations thereof, may be used as sensing materials for high temperature applications in deeper sections of compressor 12 and throughout turbine 16. These alloys may be used as sensing material deposited in various sensing configurations to form sensors such as heat flux sensors, strain sensors and wear sensors.

Figure 5:
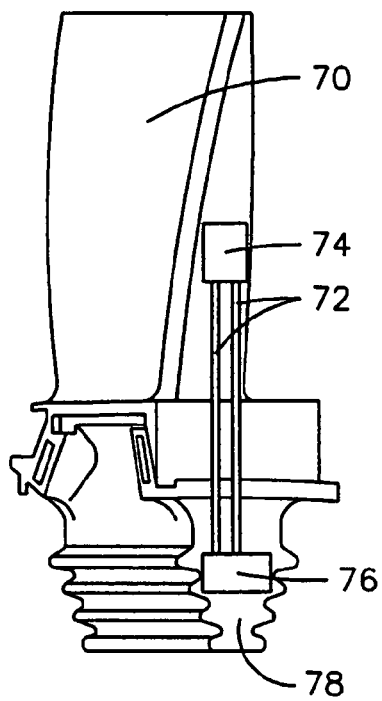
FIG. 5 is a perspective view of an exemplary turbine blade, sensor and wireless telemetry device.

Components within combustion turbine 10, such as blades 18, 19 and/or vanes 22, 23 may have application specific sensors 50 deposited to conform to a component's surface and/or embedded within a barrier or other coating deposited within combustion turbine 10. For example, FIG. 5 shows an exemplary turbine blade 70, which may be a blade from row 1 of turbine 16, having high temperature resistant lead wires, such as connectors 72 deposited to connect an embedded or surface mounted sensor 74 with a wireless telemetry device 76. Device 76 may be mounted in a location where the telemetry components are exposed to relatively lower temperatures, such as proximate the root 78 of blade 70 where the operating temperature is typically about 150° C.-250° C. and higher.

Silicon-based electronic semiconductors, such as those that may be used for transmitting data may have limited applications due to their operational temperature constraints. Temperature and performance properties of silicon and silicon-on-insulator (SOI) electronic chip technologies may limit their applications to operating environments of less than about 200° C. Aspects of the invention allow for such electronic systems to be deployed for wireless telemetry device 76 within compressor 12, which typically has an operating temperature of about 100-150° C.

Embodiments of wireless telemetry sensor systems may be configured to operate within higher temperature regions present in later stages of compressor 12, and within turbine 16. These regions may have operating temperatures of about 150-250° C. and higher. Materials having temperature and electrical properties capable of operation in these higher temperature regions may be used for depositing sensors 50, 74, connectors 52, 72 and fabricating wireless telemetry devices 76.

Sensors 74 and high temperature interconnect lines or connectors 72 may be deposited using known deposition processes such as plasma spraying, EB PVD, CVD, pulsed laser deposition, mini-plasma, direct-write, mini-HVOF or solution plasma spraying. Typically, dynamic pressure measurements, dynamic and static strain, and dynamic acceleration measurements are desired on both stationary and rotating components of combustion turbine 10 together with component surface temperature and heat flux measurements. Thus, embedded or surface mounted sensors 74 may be configured as strain gages, thermocouples, heat-flux sensors, pressure transducers, micro-accelerometers as well as other desired sensors.

Figure 6:
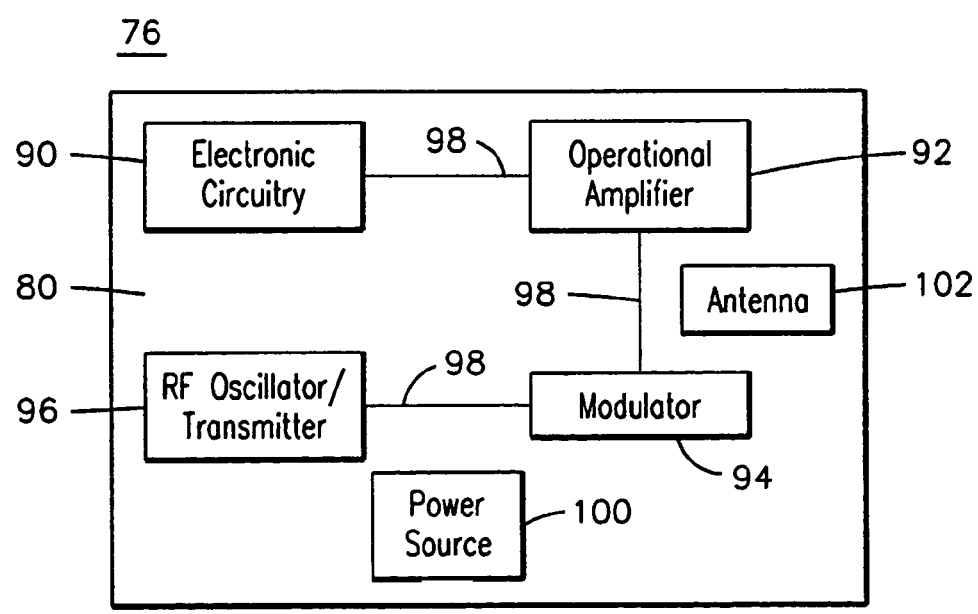
FIG. 6 is a schematic of an exemplary wireless telemetry device.

FIG. 6 is a schematic of a representative embodiment of a wireless telemetry device 76. Device 76 may be formed as a circuit board or integrated chip that includes a plurality of electronic components such as resistors, capacitors, inductors, transistors, transducers, modulators, oscillators, transmitters, amplifiers, and diodes either embossed, surface mounted or otherwise deposited thereon with or without an integral antenna and/or power source. Embodiments of wireless telemetry device 76 may be fabricated for use in compressor 12 and/or turbine 16.

Wireless telemetry device 76 may include a board 80, an electronic circuit 90, an operational amplifier 92, a modulator 94 and an RF oscillator/transmitter 96 electrically connected with each other via interconnects 98. The embodiment of FIG. 6 is an exemplary embodiment and other embodiments of device 76 are contemplated depending on performance specifications and operating environments. Embodiments of device 76 allow for a power source 100, and a transmitting and receiving antenna 102 to be fabricated on board 80 thereby forming a transmitter such as transmitter 54 shown in FIGS. 2 & 3, or wireless telemetry device 76, shown in FIG. 5.

Figure 7:
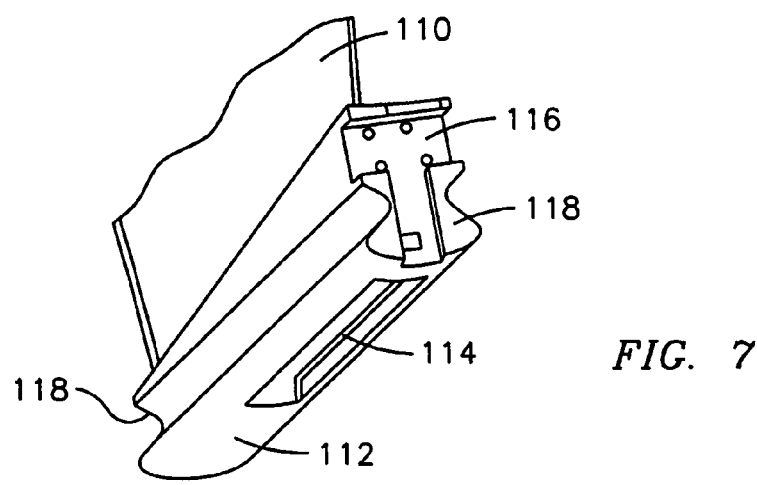
FIG. 7 is a partial perspective view of an exemplary compressor blade.

FIG. 7 illustrates a partial perspective view of an exemplary blade, such as a blade 110 having a blade root 112, which may be a compressor blade within compressor 12. One or more recesses or trenches 114 may be formed within root 112 such as within the bottom of blade root 112. Recesses 114 may be formed in various shapes or dimensions and located within blade root 112 at various places along its length. One or more recesses or trenches 116 may be formed in one or more faces 118 of blade root 112. Recesses 116 may be formed in various shapes or dimensions and located within blade root 112 at various places within a face 118. Recesses 114, 116 may be formed using various methods such as by milling them out after blade 110 is cast or by forming them as part of the blade 110 mold.

Figure 8:
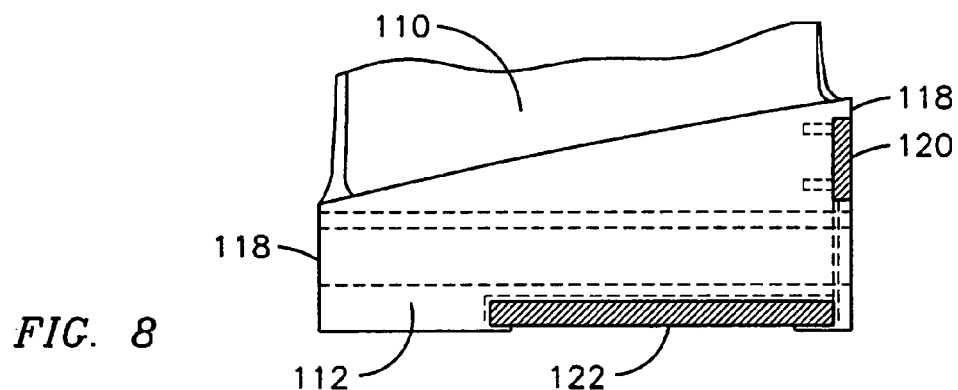
FIG. 8 is a partial side view of the exemplary compressor blade of FIG. 7.

FIG. 8 illustrates compressor blade 110 instrumented with components of wireless telemetry device 76 affixed within blade root 112. In this respect, alternate embodiments of wireless telemetry device 76 allow for one or more electrical components 90, 92, 94, 96, 100, 102, shown in FIG. 6, to be mounted separately or contained on discrete boards 80 that are electrically connected and affixed with an instrumented component such as blade root 112. For example, a transmitting and receiving antenna 102 shown in FIG. 8 may be mounted separately from and electrically connected with board 80 having a transmitter 122 formed thereon and being electrically connected with antenna 102.

Antenna 120 may be seated within recess 116 and transmitter 122 may be seated within recess 114. In this aspect, antenna 120 and transmitter 122 are not mounted/embossed or deposited onto a board 80. In other embodiments, antenna 120 may be deposited on a wireless telemetry board 80, as shown in FIG. 6, and the data may be transmitted using wireless telemetry to a receiver such as a stationary mounted transceiver 56. Power source 100 may be integral with board 80 or located separately from the board and mounted as a discrete component.

Figure 9:
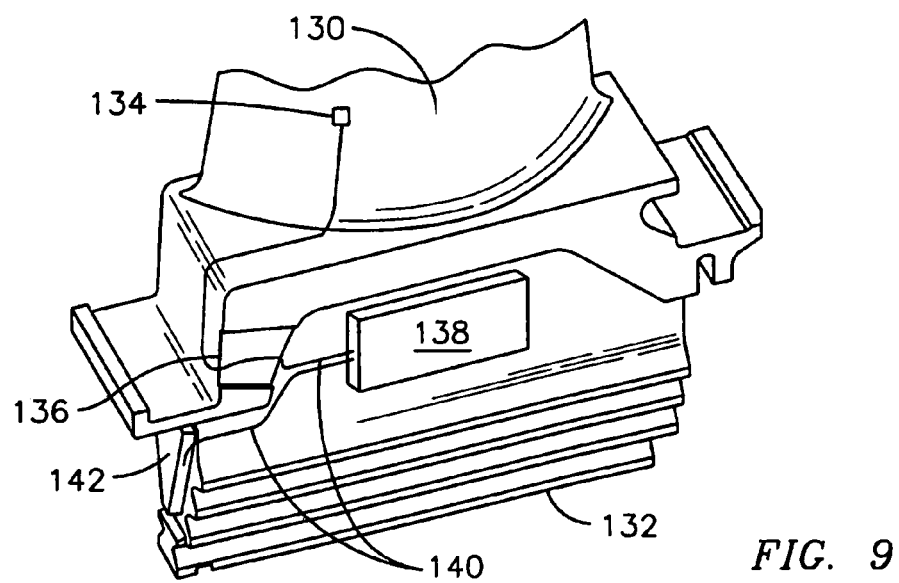
FIG. 9 is a partial cross sectional view of the exemplary turbine blade of FIG. 5.

FIG. 9 illustrates a partial view of an exemplary blade 130, which may be a turbine blade such as one of the turbine blades 18. Turbine blade 130 includes a root portion 132 defining an outer mold line for mating with a rotor disk of turbine 16 within which blade 130 may be secured for operation of combustion turbine 10. Sensing material may be deposited on blade 130 or within a barrier coating deposited on the blade's surface to form a sensor 134. Connecting material may be deposited to form connectors 140 so that data signals from sensor 134 may be communicated to a transmitter 138 and subsequently to an antenna 132. A recess 136 may be formed within a portion of blade 130 so that one or more connectors 140 are seated below an outer surface of blade 130.

Transmitter 138 and antenna 142 may be integrally secured with blade 130 so that the outer mold line defined by root 132 is not altered. For example, transmitter 138 may be affixed to a transition area, or platform, above the fir tree portion of root 132 and antenna 142 may be affixed to a face of root 132. Alternately, recesses may be formed within the platform and face so that all or a portion of transmitter 138 and/or antenna 142 are seated below the surface of the outer mold line of blade root 172. Transmitter 138 and antenna 142 may be secured within respective recesses using an epoxy or adhesive and a backfill material may be place over them for protection from high temperatures or particulates.

With respect to FIG. 5, wireless telemetry device 76 may be affixed to blade root 78 externally or embedded in such a way so that an outer mold line of the blade root is not significantly altered. Device 76 may be affixed proximate blade root 78 so that it is contained within a cavity that is created between the blade root 78 and a rotor disk of turbine 16 when blade root 78 is inserted within the rotor disk. This enables a turbine blade 70 instrumented with sensor 74, connectors 72 and device 76 to be installed into a mating segment of a rotor disk of turbine 16 in the same manner as a turbine blade that is not instrumented. In this respect, instrumented blade 70 may be manufactured having all components necessary for wirelessly extracting data indicative of various operating parameters or conditions of blade 70 and/or a barrier coating deposited thereon and transmitting that data to a receiving device.

For example, one or more recesses or trenches may be formed into a portion of the substrate of blade 90, such as blade root 98, within which one or more wireless telemetry devices 96 may be contained. Trenches may be formed by milling out desired regions of blade root 98 and securing device 96 within the trench with an epoxy or other suitable binder. The trenches may be back filled with a suitably high temperature cement or ceramic paste to protect device 96.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An instrumented component for use in a combustion turbine engine including a compressor, a rotor disk and a turbine, the instrumented component comprising:
    a substrate forming a blade for use within the combustion turbine engine;
    a root portion integrally formed with the substrate for insertion within a mating segment of the rotor disk for securing the blade within the rotor disk;
    at least one sensing material deposited in connection with the substrate for sensing a condition of the blade;
    a wireless telemetry device affixed with the root portion; and
    at least one connector electrically connecting the at least one sensing material to the wireless telemetry device for communicating a data signal from the at least one sensing material to the wireless telemetry device.

2. The instrumented component of claim 1 further comprising:
    at least one recess formed in the root portion wherein the wireless telemetry device is affixed within the at least one recess.

3. The instrumented component of claim 2 further comprising:
    a first recess formed within a face of the root portion;
    a second recess formed within a bottom of the root portion; and
    wherein the wireless telemetry device comprising an antenna secured within a first one of the first recess and the second recess and a transmitter secured within a second one of the first recess and the second recess.

4. The instrumented component of claim 2, the wireless telemetry device comprising at least one electronic circuit configured for receiving the data signal and transmitting a corresponding data signal indicative of the condition of the blade, the wireless telemetry device capable of operating within an environment of between about 150° C. and 300° C.

5. The instrumented component of claim 4, the sensing material comprising a composition selected from the group of materials consisting of NiCr and NiAl wherein the sensing material is deposited to form at least one sensor selected from the group of a strain sensor, a heat flux sensor and a wear sensor.

6. The instrumented component of claim 1, the sensing material comprising a composition selected from the group of materials consisting of Pt—Rh, Pt—Rh(10), Pt—Rh(13) and combinations thereof, wherein the sensing material is deposited to form at least one thermocouple.

7. The instrumented component of claim 1, the sensing material comprising a composition selected from the group of materials consisting of NiCrSi and NiSi wherein the sensing material is deposited to form at least one sensor selected from the group of a strain sensor, a heat flux sensor and a wear sensor.

8. The instrumented component of claim 7, the substrate forming a blade for use within the turbine of the combustion turbine engine.

9. The instrumented component of claim 1, the wireless telemetry device comprising a transmitter secured to a platform of the root portion and an antenna secured to a face of the root portion, the substrate forming a blade for use within the turbine section of the combustion turbine engine.

10. The instrumented component of claim 1 further comprising:
    a thermal barrier coating deposited over the substrate;
    the sensing material comprising a composition selected from the group of materials consisting of NiCrSi and NiSi wherein the sensing material is deposited to form a thermocouple within the thermal barrier coating; and
    the wireless telemetry device comprising a transmitter secured to a platform of the root portion and an antenna secured to a face of the root portion, the substrate forming a blade for use within the turbine of the combustion turbine engine.

11. A blade for use within a combustion turbine engine, the blade comprising:
    a substrate forming the blade;
    a root portion integrally formed with the blade;
    a sensing material deposited in connection with the blade, the sensing material deposited to form a sensor for sensing a condition of the blade;
    at least one recess formed within the root portion;
    a wireless telemetry device secured within the at least one recess; and
    a connector electrically connecting the sensing material with the wireless telemetry device.

12. The blade of claim 11, the sensing material comprising a Ni alloy selected from the group consisting of NiCr and NiAl wherein the sensing material is deposited to form at least one sensor selected from the group of a strain sensor, a heat flux sensor and a wear sensor.

13. The blade of claim 12, the substrate forming the blade for use within a compressor section of the combustion turbine engine.

14. The blade of claim 11, the sensing material comprising a material selected from the group of NiCrSi, NiSi, Pt—Rh, Pt—Rh(10), Pt—Rh(13) and combinations thereof, wherein the sensing material is deposited to form at least one sensor selected from the group of a strain sensor, a heat flux sensor and a wear sensor.

15. The blade of claim 14, the substrate forming the blade for use within a turbine section of the combustion turbine engine.

16. An instrumented component for use within a combustion turbine engine having a rotor disk, the instrumented component comprising:
    a substrate;
    a sensing material deposited in connection with the substrate for sensing a condition of the instrumented component;
    a wireless telemetry device affixed to a root portion of the substrate, the root portion integrally formed with the substrate and configured for securing the instrumented component to the rotor disk wherein the wireless telemetry device comprising at least one electronic circuit capable of operating within an environment of between about 150° C. and 300° C.; and
    at least one connector connecting the sensing material to the wireless telemetry device wherein a data signal is transmitted from the sensing material to the wireless telemetry device by the at least one connector, the data signal indicative of the condition of the instrumented component.

17. The instrumented component of claim 16, the sensing material comprising Pt—Rh, Pt—Rh(10), Pt—Rh(13) and combinations thereof, deposited to form at least one thermocouple.

18. The instrumented component of claim 16 further comprising:
    at least one recess formed within the root portion; and
    wherein the wireless telemetry device is affixed within the at least one recess.

19. The instrumented component of claim 18, the wireless telemetry device comprising an antenna affixed within a first recess formed within the root portion and a transmitter affixed within a second recess formed within the root portion, the substrate comprising a compressor blade.

20. The instrumented component of claim 16, the wireless telemetry device comprising an antenna and a transmitter affixed to the root portion of the substrate, the substrate comprising a turbine blade.

* * * * *